(12) United States Patent
Marzorati et al.

(10) Patent No.: US 11,558,204 B2
(45) Date of Patent: Jan. 17, 2023

(54) ATTESTING CONTROL OVER NETWORK DEVICES

(71) Applicant: International Business Machines Corporation, Armonk, NY (US)

(72) Inventors: Mauro Marzorati, Lutz, FL (US); Rosa M. Bolger, Austin, TX (US); Herbert Daniel Pearthree, Cary, NC (US); Gregory Porpora, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 16/994,752

(22) Filed: Aug. 17, 2020

(65) Prior Publication Data

US 2022/0052859 A1 Feb. 17, 2022

(51) Int. Cl.
*H04L 9/32* (2006.01)
*H04L 9/40* (2022.01)

(52) U.S. Cl.
CPC ........ *H04L 9/3268* (2013.01); *H04L 63/0428* (2013.01); *H04L 63/0823* (2013.01); *H04L 63/166* (2013.01)

(58) Field of Classification Search
None
See application file for complete search history.

(56) References Cited

U.S. PATENT DOCUMENTS

| 9,184,918 B2 | 11/2015 | Spiers | |
|---|---|---|---|
| 2019/0222588 A1* | 7/2019 | Marzorati | H04L 67/04 |
| 2020/0053060 A1* | 2/2020 | Moritomo | H04L 9/3268 |
| 2021/0105304 A1* | 4/2021 | Kraning | H04L 41/50 |

FOREIGN PATENT DOCUMENTS

WO 2015171478 A1 11/2015

OTHER PUBLICATIONS

"TCP Wrappers", Wikipedia, Last edited Jun. 7, 2019, at 14:48 (UTC), 2 pages, <https://en.wikipedia.org/w/index.php?title=TCP_Wrappers&oldid=900779141>.
Aziz et al., "Extending TLS with Mutual Attestation for Platform Integrity Assurance", Journal of Communications, 9(1), Jan. 2014, ©2014 Engineering and Technology Publishing, pp. 63-72.
Dunwoody, M., "APT29 Domain Fronting With TOR", FireEye Threat Research, Mar. 27, 2017, 6 pages, <https://www.fireeye.com/blog/threat-research/2017/03/apt29_domain_frontin.html>.

(Continued)

*Primary Examiner* — Brandon Hoffman
(74) *Attorney, Agent, or Firm* — Donald G. Weiss; Gavin Giraud

(57) ABSTRACT

In an approach to attesting control over network devices, responsive to receiving a first signal from a client, wherein the first signal initiates a network connection between the client and a server, a first certificate is sent to the client that contains a common name that is an internet protocol (IP) address. A second certificate is sent to the client that contains a common name that is a uniform resource locator (URL) of the server. Responsive to receiving a second signal from the client that the first certificate and the second certificate are trusted, the client is connected with the server.

20 Claims, 10 Drawing Sheets

(56) References Cited

OTHER PUBLICATIONS

Knauth et al., "Integrating Intel SGX Remote Attestation with Transport Layer Security", Intel Labs, Version 2.0, arXiv preprint arXiv:1801.05863, 2018, 14 pages <https://arxiv.org/pdf/1801.05863>.

Mates, M., "Privacy 2019: Fixing A 16 Year-Old Privacy Problem in TLS With ESNI", Sentinel One, Apr. 29, 2019, 7 pages, <https://www.sentinelone.com/blog/privacy-2019-fixing-16-year-old-problem-tls-esni/>.

Mates, M., "Privacy 2019: TOR, MEEK & The Rise and Fall of Domain Fronting", Sentinel One, Apr. 15, 2019, 8 pages, <https://www.sentinelone.com/blog/privacy-2019-tor-meek-rise-fall-domain-fronting/>.

Naylor et al., "Multi-Context TLS (mcTLS): Enabling Secure In-Network Functionality in TLS", SIGCOMM '15, Aug. 17-21, 2015, London, United Kingdom, © 2015 ACM, 14 pages.

Walsh et al., "Mechanisms for Mutual Attested Microservice Communication", UCC'17 Companion, Dec. 5-8, 2017, Austin, TX, 6 pages.

Yan et al., "Design and Implementation of Remote Anonymous Attestation Protocol Based on Trusted Cloud Computing Platform", The Open Cybernetics & Systemics Journal, 2015, 9, pp. 415-421.

\* cited by examiner

ATTESTING CONTROL OVER NETWORK DEVICES

BACKGROUND

The present invention relates generally to the field of cryptographic mechanisms for secure communication, and more particularly to attesting control over network devices.

Transport Layer Security (TLS), and its now-deprecated predecessor, Secure Sockets Layer (SSL), are cryptographic protocols designed to provide communications security over computer networks, including the Internet. A primary use case of TLS is encrypting the communication between web applications and web servers, such as a web browser connecting to a website. TLS is also used to encrypt other communications such as email, messaging, and Voice over Internet Protocol (VoIP).

TLS can be used on top of a transport-layer protocol like Transmission Control Protocol (TCP). There are three main components to TLS, namely encryption, authentication, and integrity. Encryption encodes the data being transferred to and from third parties. Authentication ensures that the parties exchanging information are who they claim to be. Integrity verifies that the data has not been forged or tampered with.

The TLS protocol aims primarily to provide privacy (security) and data integrity between two or more communicating computer applications. The connection is private (or secure) because symmetric cryptography is used to encrypt the data transmitted, where the keys for this symmetric encryption are based on a shared secret that was negotiated at the start of the session during the TLS handshake. The TLS handshake establishes a cypher suite for each communication session. The cypher suite is a set of algorithms that specifies details such as which shared encryption keys, or session keys, will be used for that particular session.

SUMMARY

Embodiments of the present invention disclose a method, a computer program product, and a system for attesting control over network devices. In one embodiment, responsive to receiving a first signal from a client, wherein the first signal initiates a network connection between the client and a server, a first certificate is sent to the client that contains a common name that is an internet protocol (IP) address. A second certificate is sent to the client that contains a common name that is a uniform resource locator (URL) of the server. Responsive to receiving a second signal from the client that the first certificate and the second certificate are trusted, the client is connected with the server.

DETAILED DESCRIPTION

Figure 1:
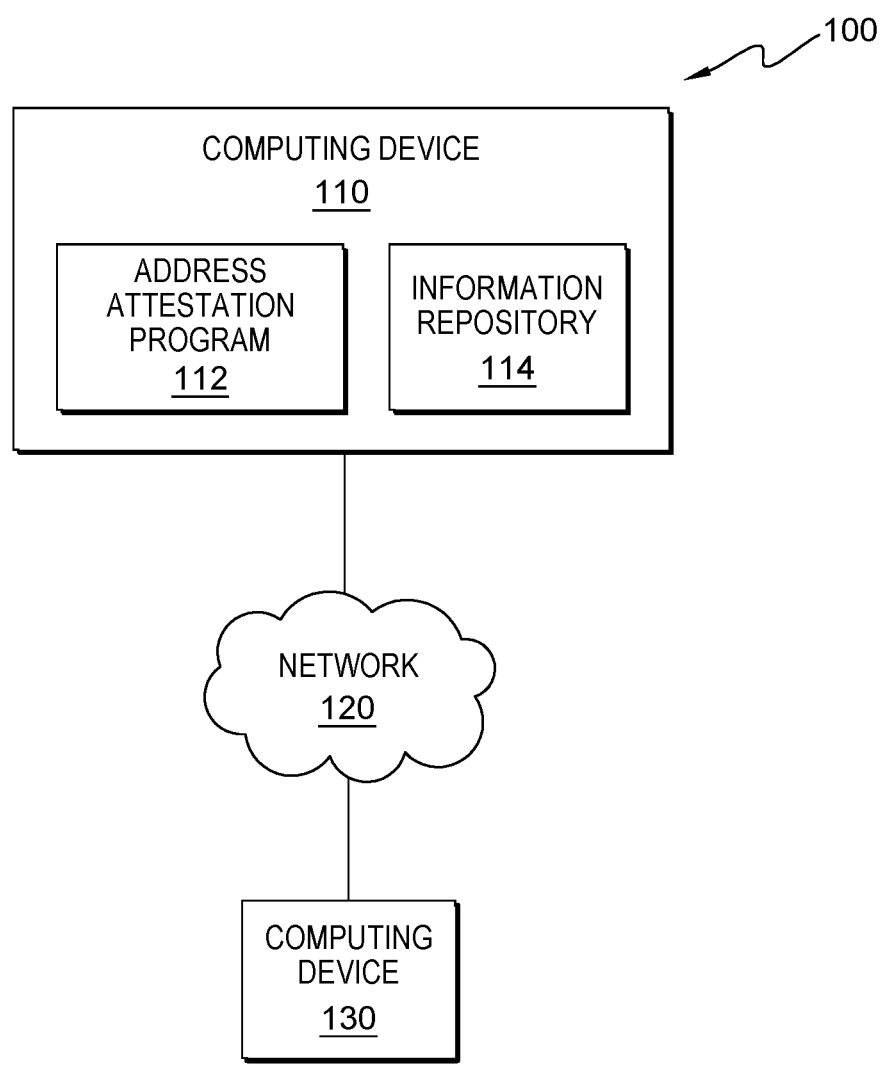
FIG. 1 is a functional block diagram illustrating a distributed data processing environment, in accordance with an embodiment of the present invention.

In the physical world when you travel to the Example Restaurant located on 123 Any Street, there is a an implicit mechanism—the numbered or named street sign—whereby you can check that you are at 123 Any Street independently of any tie-in with the commercial concern at that address. The property owner at that address may have leased the ground floor to the restaurateur, and the upper floors to other tenants. There is no equivalent mechanism in the transmission control protocol/internet protocol (TCP/IP) digital world at any layer of the OSI model.

Bringing the situation to the digital world, a user wishing to connect to ExampleRestaurant.com will input that URL into a web browser and it will eventually connect to some IP address, e.g., 127.127.127.127. The world wide web server program operating at that address may attest their identity, e.g., ExampleRestaurant.com, using the TLS/SSL mechanisms as described above. Other tenants may do so as well, but there is no mechanism for the owner/operator of IP address 127.127.127.127 to attest that they are in control of this address. It is merely assumed that by completing the connection the destination is the intended one and it is operated by the intended operator.

Jumping back into the physical world, if someone were to construct a facsimile of Any Street and run a commercial concern at house number 123, you could use any number of external methods to expose the duplicity, such as matching GPS coordinates, matching the reported weather conditions with observed conditions, etc. But due to mechanisms like Domain Name System (DNS) and Border Gateway Protocol highjacks where IP routing prefixes are compromised, such facsimile attacks are now commonplace. Cloud and Managed Service Providers (MSPs) are left without a mechanism to establish the authenticity of, and attest their control over, their addresses and devices.

Domain fronting is a technique to obfuscate the Server Name Identification (SNI) field of a TLS connection, effectively hiding the target domain of a connection until after the TLS connection has been made. It requires finding a hosting provider or content delivery network which has a certificate that supports multiple target domains, like the multiple tenants at 123 Any Street in the example above. One of the domains will be a common one which the server wants to pretend to be the target in the connection establishment in the SNI field, and the other domain is the actual target of the connection and the following HTTP request. In other words, the target domain to which the client intends to connect is not necessarily the target to which the client has actually connected.

Mechanisms are needed whereby assertions of control over a device may be made independent of the function or operator of the device. The present invention discloses several embodiments to allow operators to make attestations about the network addresses of the devices independently of the services deployed on those devices. Common to all these embodiments is disjoining the station's network address from the service or application running on that same station. This separation provides the opportunity for the station operator to introduce attestations about the station itself to allow a connecting client to evaluate whether to proceed with the transaction.

One embodiment leverages a TCP wrapper technique in combination with a domain fronting technique, while another embodiment leverages the TCP wrapper technique along with a TCP handshake, e.g., a 3-way handshake, to provide the desired attestations.

The TCP wrapper technique uses a wrapper library employing a host.allow, host.deny rule to set up TCP sockets on behalf of running programs if they conform to a given specification. One common library with a common programming and configuration can thus wrap many network-aware programs on a given station. This technique was developed to provide access control mechanisms before the use of host-based firewall programs became common place. While this technique has been deprecated for access control, it is still useful to provide value-add in an underserved area of development, such as attestation of validity in network stations.

The main technique for achieving attestation is a collaborative approach where the certificates of both the MSP and the service provider are supplied as part of the TLS handshake. TLS operations currently support the sending of several certificates to form a trust chain from the leaf certificate back to the root certificate issued by the certificate authority. The operator of a TLS-compliant service may thus include any number of certificates with the Basic-Constraints extension as detailed in version 3 X.509 certificates to establish this chain. If the certificates in the path do not exceed the path length constraint, the chain can be considered valid. Inclusion of an additional certificate (or certificate-chain) issued to the MSP for attestation of control over IP addresses would be processed by knowledgeable client stations and ignored by others.

FIG. 1 is a functional block diagram illustrating a distributed data processing environment, generally designated 100, suitable for operation of address attestation program 112 in accordance with at least one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes computing device 110 and computing device 130, both connected to network 120. Network 120 can be, for example, a telecommunications network, a local area network (LAN), a wide area network (WAN), such as the Internet, or a combination of the three, and can include wired, wireless, or fiber optic connections. Network 120 can include one or more wired and/or wireless networks that are capable of receiving and transmitting data, voice, and/or video signals, including multimedia signals that include voice, data, and video information. In general, network 120 can be any combination of connections and protocols that will support communications between computing device 110 and other computing devices (not shown) within distributed data processing environment 100.

Computing device 110 can be a standalone computing device, a management server, a web server, a mobile computing device, or any other electronic device or computing system capable of receiving, sending, and processing data. In an embodiment, computing device 110 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 110 can represent a server computing system utilizing multiple computers as a server system, such as in a cloud computing environment. In yet another embodiment, computing device 110 represents a computing system utilizing clustered computers and components (e.g., database server computers, application server computers, etc.) that act as a single pool of seamless resources when accessed within distributed data processing environment 100.

In an embodiment, computing device 110 includes address attestation program 112. In an embodiment, address attestation program 112 is a program, application, or subprogram of a larger program for attesting control over network devices. In an alternative embodiment, address attestation program 112 may be located on any other device accessible by computing device 110 via network 120.

In an embodiment, computing device 110 includes information repository 114. In an embodiment, information repository 114 may be managed by address attestation program 112. In an alternate embodiment, information repository 114 may be managed by the operating system of the device, alone, or together with, address attestation program 112. Information repository 114 is a data repository that can store, gather, compare, and/or combine information. In some embodiments, information repository 114 is located externally to computing device 110 and accessed through a communication network, such as network 120. In some embodiments, information repository 114 is stored on computing device 110. In some embodiments, information repository 114 may reside on another computing device (not shown), provided that information repository 114 is accessible by computing device 110. Information repository 114 includes, but is not limited to, web server data, security data, certificate data, client data, and other data that is received by address attestation program 112 from one or more sources, and data that is created by address attestation program 112.

Information repository 114 may be implemented using any volatile or non-volatile storage media for storing information, as known in the art. For example, information repository 114 may be implemented with a tape library, optical library, one or more independent hard disk drives, multiple hard disk drives in a redundant array of independent disks (RAID), solid-state drives (SSD), or random-access memory (RAM). Similarly, information repository 114 may be implemented with any suitable storage architecture known in the art, such as a relational database, an object-oriented database, or one or more tables.

Distributed data processing environment 100 includes computing device 130. Computing device 130 can be a standalone computing device, a management server, a web server, a mobile computing device, or any other electronic device or computing system capable of receiving, sending, and processing data. In an embodiment, computing device 130 can be a laptop computer, a tablet computer, a netbook computer, a personal computer (PC), a desktop computer, a personal digital assistant (PDA), a smart phone, or any programmable electronic device capable of communicating with other computing devices (not shown) within distributed data processing environment 100 via network 120. In another embodiment, computing device 130 can represent a server computing system utilizing multiple computers as a server system, such as in a cloud computing environment. In yet another embodiment, computing device 130 represents a computing system utilizing clustered computers and components (e.g., database server computers, application server computers, etc.) that act as a single pool of seamless resources when accessed within distributed data processing environment 100.

Figure 2:
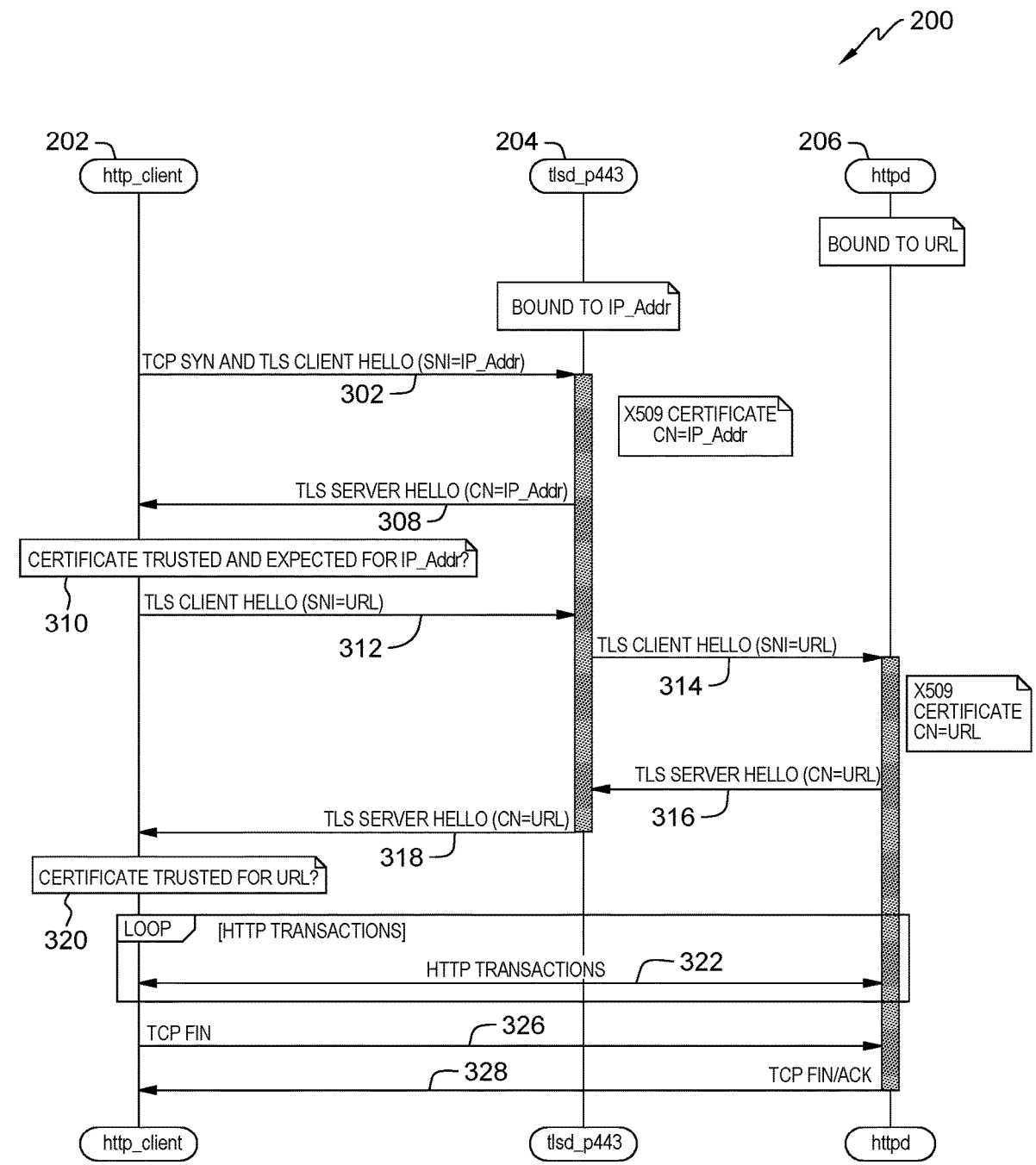
FIG. 2 is a web sequence diagram of the steps to securely communicate with a server providing address attestation using the domain fronting technique, in accordance with an embodiment of the present invention.

FIG. 2 is a web sequence diagram, generally designated 200, representing one embodiment of the present invention. This embodiment demonstrates the domain fronting technique for attesting control over network devices. Web sequence diagram 200 includes http_client 202, the client requesting access to the website hosted on computing device 110; tlsd_p443 204, the TLS daemon using TCP port 443 (the standard TCP port for TLS) that implements the TLS protocol on computing device 110; and httpd 206, the HTTP daemon that implements the HTTP protocol (the actual webserver) on computing device 110. Although tlsd_p443 204 and httpd 206 are shown in FIG. 2 as part of computing device 110, in other embodiments tlsd_p443 204 and httpd 206 may be hosted on other computing devices accessible to computing device 110 over network 120. The reference designators 302 through 330 represent the steps in the flow diagram of FIG. 3, and are explained below.

In this embodiment, the client has already performed a standard DNS lookup to acquire an IP address for the URL of the desired website. The client makes a combined TCP and TLS request to a web server without disclosing the name of the intended service; only the layer 4 IP address is revealed in the datagram. The server-wrapper, tlsd_p443 204 in this embodiment, presents a certificate, e.g., an X.509 certificate, that matches the address (or addresses if using the Subject Alternative Name (SAN) and/or wildcards methods, which allow additional host names to be protected by a single SSL certificate) to the client in response. At this point the server-wrapper is ready to connect the client to the webserver.

Once validation of the trustworthiness of the certificate in question is received from the client, the TLS handshake is complete, thereby creating a secure socket to the server on the basis of the attestation to operate the layer 4 IP address. Next, a secondary SSL handshake, this time requesting the server by name, is received from the client. The server-wrapper forwards this secondary request to the webserver program, httpd 206, where the second TLS/SSL handshake takes place. Once the second TLS/SSL handshake is complete, HTTP transactions proceed along normally.

Figure 3:
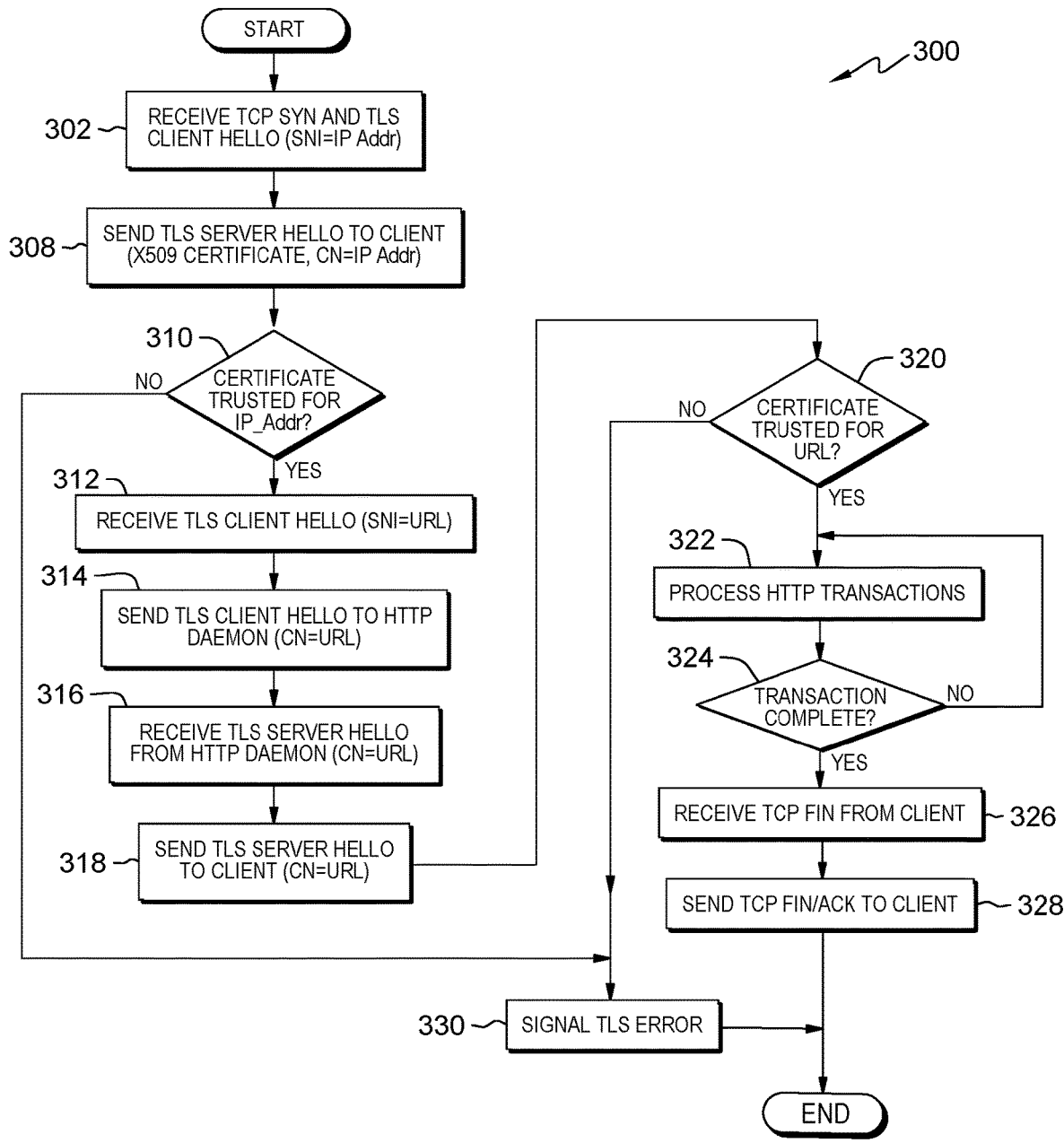
FIG. 3 is a flowchart depicting operational steps of the address attestation program, on a computing device within the distributed data processing environment of FIG. 1, for attesting control over network devices using the domain fronting technique, in accordance with an embodiment of the present invention.

FIG. 3 is a flow chart diagram of workflow 300 depicting operational steps for address attestation program 112 for attesting control over network devices in accordance with at least an embodiment of the invention as depicted in FIG. 2. In an alternative embodiment, the steps of workflow 300 may be performed by any other program while working with address attestation program 112. In an embodiment, address attestation program 112 receives the TLS client hello for the IP address. In an embodiment, address attestation program 112 sends the TLS server hello to the client. In an embodiment, address attestation program 112 determines if the certificate is trusted for the IP address. In an embodiment, address attestation program 112 receive the TLS client hello for the URL. In an embodiment, attestation program 112 sends the TLS client hello to the httpd. In an embodiment, address attestation program 112 receives the TLS server hello from the httpd. In an embodiment, address attestation program 112 sends the TLS server hello to the client for the URL. In an embodiment, address attestation program 112 determines if the certificate is trusted for the URL. In an embodiment, if address attestation program 112 determines that the certificate is trusted for the URL, then address attestation program 112 processes the http transactions. In an embodiment, address attestation program 112 determines if the transactions are complete. In an embodiment, if address attestation program 112 determines that the transactions are complete, then address attestation program 112 receives the TCP FIN signal from the client. In an embodiment, address attestation program 112 sends the TCP FIN/ACK to the client. In an embodiment, if address attestation program 112 determines that the certificate is not trusted for the URL, then address attestation program 112 signals a TLS error and terminates the session.

It should be appreciated that embodiments of the present invention provide at least for attesting control over network devices. However, FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

Address attestation program 112 receives the TCP SYN and TLS client hello (SNI=IP Addr) (step 302). In an embodiment, address attestation program 112 receives a TCP SYN packet and a client hello message via the tlsd, for example, tlsd_p443 204 from FIG. 2, to start the TCP session. TCP SYN is a packet sent to another device requesting that a connection be established, while the TLS client hello message initiates a secure connection between the devices. In the message, the SNI is the IP address of the desired web server, for example, httpd 206 from FIG. 2. The IP address of the desired web server was previously obtained by the client via a standard DNS lookup. In this embodiment, the same tlsd handles both the TCP session initialization and the TLS handshake.

Address attestation program 112 sends the TLS server hello to the client (X.509 certificate, common name (CN)=IP Addr) (step 308). In an embodiment, address attestation program 112 transmits a server hello message via the tlsd to the client. The server hello message contains the SSL certificate (e.g., X.509 certificate) and chosen cipher suite for the server. In the message and the certificate, the CN is the IP address of the requested web server.

Address attestation program 112 determines if the certificate is trusted for the IP address (decision block 310). In an embodiment, if address attestation program 112 receives an indication from the client that the certificate is valid for the desired IP address ("yes" branch, decision block 310), then address attestation program 112 proceeds to step 312. If address attestation program 112 does not receive an indication from the client that the certificate is valid for the desired IP address ("no" branch, decision block 310), then address attestation program 112 proceeds to step 330 to signal a TLS error.

Address attestation program 112 receive the TLS client hello (SNI=URL) (step 312). In an embodiment, if address attestation program 112 receives an indication from the client that the certificate is valid for the desired IP address, then address attestation program 112 receives a client hello message via the tlsd where the SNI is the URL of the desired web server, rather than the IP address of the web server as in step 302.

Address attestation program 112 sends the TLS client hello to the httpd (CN=URL) (step 314). In an embodiment, address attestation program 112 sends the TLS client hello message that was received by the tlsd to the httpd that is the requested web server. The SNI of the message is the URL requested by the client, rather than the IP address as in step 302.

Address attestation program 112 receives the TLS server hello from the httpd (SNI=URL) (step 316). In an embodiment, address attestation program 112 receives a server hello message via the tlsd from the http daemon that is the requested web server. In the message, the SNI is the URL of the requested web server, rather than the IP address as in step 304.

Address attestation program 112 sends the TLS server hello to the client (CN=URL) (step 318). In an embodiment, address attestation program 112 transmits the server hello message that it received from the http daemon to the client via the tlsd. In the message, the CN is the URL of the requested web server, and the message includes an X.509 certificate where the CN in the certificate is the URL of the requested web server.

Address attestation program 112 determines if the certificate is trusted for the URL (decision block 320). In an embodiment, if address attestation program 112 receives an indication from the client that the certificate is valid for the desired URL ("yes" branch, decision block 320), then address attestation program 112 proceeds to step 324. If address attestation program 112 does not receive an indication from the client that the certificate is valid for the desired URL ("no" branch, decision block 320), then address attestation program 112 proceeds to step 330 to signal a TLS error.

Address attestation program 112 processes the http transactions (step 322). In an embodiment, if address attestation program 112 receives an indication from the client that the certificate is valid for the desired URL, then address attestation program 112 begins http transactions between the client and the web server (httpd).

Address attestation program 112 determines if the transactions are complete (decision block 324). In an embodiment, address attestation program 112 determines if the http transactions have completed. If address attestation program 112 determines that the transactions are complete ("yes" branch, decision block 324), then address attestation program 112 proceeds to step 326. If address attestation program 112 determines that the transactions are not complete ("no" branch, decision block 324), then address attestation program 112 returns to step 322.

Address attestation program 112 receives the TCP FIN signal from the client (step 326). In an embodiment, address attestation program 112 receives the TCP FIN command from the client.

Address attestation program 112 sends the TCP FIN/ACK to the client (step 328). In an embodiment, address attestation program 112 sends the TCP FIN/ACK command to the client to terminate the TCP session.

Address attestation program 112 signals a TLS error (step 330). In an embodiment, if address attestation program 112 receives an indication from the client that the certificate is not valid for the desired URL, then address attestation program 112 will refuse to initiate http transactions with the web server. Address attestation program 112 then signals an error to the client and terminates the TCP session.

Figure 4:
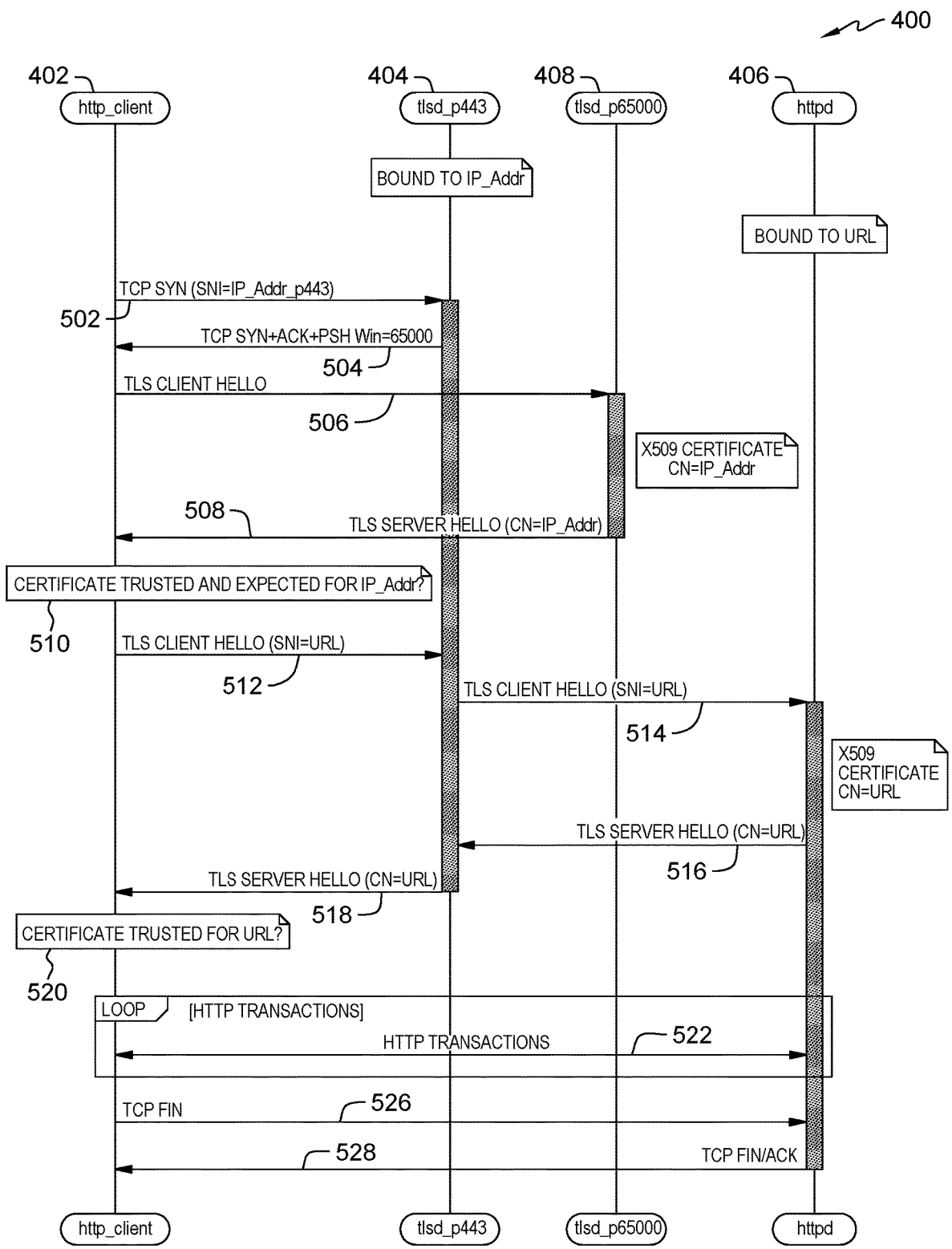
FIG. 4 is a web sequence diagram of the steps to securely communicate with a server providing address attestation using the TCP handshake method, in accordance with an embodiment of the present invention.

FIG. 4 is a web sequence diagram, generally designated 400, representing one embodiment of the present invention. This embodiment demonstrates the TCP handshake method for attesting control over network devices. In this example, a 3-way handshake is demonstrated, where a TLS daemon on the standard TCP port 443 handles the TCP handshake, and a second TLS daemon on a different TCP port (65000 in this example) handles the TLS handshake. Web sequence diagram 400 includes http_client 402, the client requesting access to the website hosted on computing device 110; tlsd_p443 404, the TLS daemon using TCP port 443 (the standard TCP port for TLS) that implements the TCP handshake on computing device 110; tlsd_p65000 408, the TLS daemon using TCP port 65000 (any valid TCP port may be used in practice) that implements the TLS protocol on computing device 110; and httpd 406, the HTTP daemon that implements the HTTP protocol (the actual webserver) on computing device 110. Although tlsd_p443 404, tlsd_p65000 408, and httpd 406 are shown in FIG. 4 as part of computing device 110, in other embodiments tlsd_p443 404, tlsd_p65000 408, and httpd 406 may be hosted on other computing devices accessible to computing device 110 over network 120. The reference designators 502 through 530 represent the steps in the flow diagram of FIG. 5, and are explained below.

In this embodiment, the client has already performed a standard DNS lookup to acquire an IP address for the URL of the desired website. The client makes a TCP request to a web server without disclosing the name of the intended service; only the layer 4 IP address is revealed in the datagram. The server-wrapper, tlsd_p443 404 in this embodiment, responds to the client with a TCP SYN message, and also sends the port number of the TLS daemon, 65000 in this example, to the client. The client then makes a TLS request to the TLS daemon without disclosing the name of the intended service; only the layer 4 IP address is revealed in the datagram. The TLS daemon, tlsd_p65000 408 in this embodiment, presents a certificate, e.g., an X.509 certificate, that matches the address (or addresses if using the SAN and/or wildcards methods, which allow additional host names to be protected by a single SSL certificate) to the client in response. At this point the server-wrapper is ready to connect the client to the webserver.

Once validation of the trustworthiness of the certificate in question is received from the client, the TLS handshake is complete, thereby creating a secure socket to the server on the basis of the attestation to operate the layer 4 IP address. Next, a secondary SSL handshake, this time requesting the server by name, is received from the client. The server-wrapper forwards this secondary request to the webserver program, httpd 406, where the second TLS/SSL handshake takes place. Once the second TLS/SSL handshake is complete, HTTP transactions proceed along normally.

Figure 5:
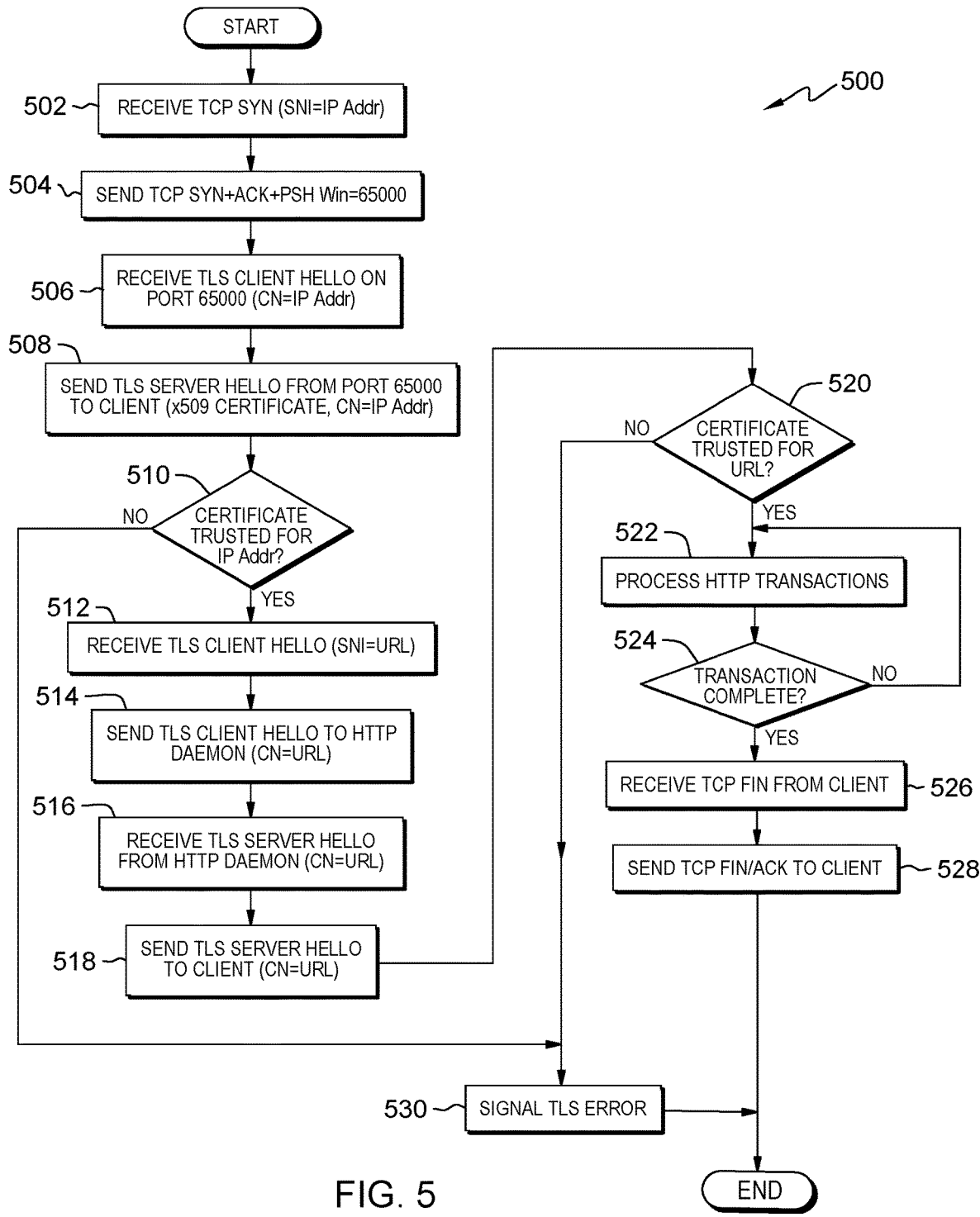
FIG. 5 is a flowchart depicting operational steps of the address attestation program, on a computing device within the distributed data processing environment of FIG. 1, for attesting control over network devices using the TCP handshake method, in accordance with an embodiment of the present invention.

FIG. 5 is a flow chart diagram of workflow 500 depicting operational steps for address attestation program 112 for attesting control over network devices in accordance with at least an embodiment of the invention as depicted in FIG. 4. In an alternative embodiment, the steps of workflow 500 may be performed by any other program while working with address attestation program 112. In an embodiment, address attestation program 112 receives the TCP SYN packet for the IP address. In an embodiment, address attestation program 112 sends the TCP ACK with a Win=65000. In an embodiment, address attestation program receives the TLS client hello on port 65000 (CN=IP Addr). In an embodiment, address attestation program 112 sends the TLS server hello to the client. In an embodiment, address attestation program 112 determines if the certificate is trusted for the IP address. In an embodiment, address attestation program 112 receive the TLS client hello for the URL. In an embodiment, attestation program 112 sends the TLS client hello to the httpd. In an embodiment, address attestation program 112 receives the TLS server hello from the httpd. In an embodiment, address attestation program 112 sends the TLS server hello to the client for the URL. In an embodiment, address attestation program 112 determines if the certificate is trusted for the URL. In an embodiment, if address attestation program 112 determines that the certificate is trusted for the URL, then address attestation program 112 processes the http transactions. In an embodiment, address attestation program 112 determines if the transactions are complete. In an embodiment, if address attestation program 112 determines that the transactions are complete, then address attestation program 112 receives the TCP FIN signal from the client. In an embodiment, address attestation program 112 sends the TCP FIN/ACK to the client. In an embodiment, if address attestation program 112 determines that the certificate is not trusted for the URL, then address attestation program 112 signals a TLS error and terminates the session.

It should be appreciated that embodiments of the present invention provide at least for attesting control over network devices. However, FIG. 5 provides only an illustration of one implementation and does not imply any limitations with regard to the environments in which different embodiments may be implemented. Many modifications to the depicted environment may be made by those skilled in the art without departing from the scope of the invention as recited by the claims.

Address attestation program 112 receives the TCP SYN packet (SNI=IP Addr) (step 502). In an embodiment, address attestation program 112 receives a TCP SYN packet via the TLS daemon, for example, tlsd_p443 404 from FIG. 4, to start the TCP session. TCP SYN is a packet sent to another device requesting that a connection be established. In the message, the SNI is the IP address of the desired web server, for example, httpd 406 from FIG. 4. The IP address of the desired web server was previously obtained by the client via a standard DNS lookup. In this embodiment, one tlsd handles the TCP session initialization, e.g., tlsd_p443 404, and a different tlsd, e.g., tlsd_p65000 408, handles the TLS handshake. In an embodiment of the TCP 3-way handshake, the two separate tlsds may be different TCP ports on the same device. In another embodiment of the TCP 3-way handshake, the two separate tlsds may be TCP ports on different devices that can communicate over network 120.

Address attestation program 112 sends the TCP SYN+ACK+PSH Win=65000 (step 504). In an embodiment, address attestation program 112 sends the TCP acknowledgement to the client. In this embodiment, the TCP acknowledgement includes the port number of the tlsd that will control the TLS session initiation (port 65000 in this example).

Address attestation program 112 receives the TLS client hello on port 65000 (CN=IP Addr) (step 506). In an embodiment, address attestation program 112 receives the TLS client hello message on Port 65000 (in this example; in other embodiments, any valid TCP port can be used). The TLS client hello message has a CN that is the IP address of the desired web server.

Address attestation program 112 sends the TLS server hello to the client (X.509 certificate, CN=IP Addr) (step 508). In an embodiment, address attestation program 112 transmits a server hello message via the tlsd to the client. The server hello message contains the SSL certificate (e.g., X.509 certificate) and chosen cipher suite for the server. In the message and the certificate, the CN is the IP address of the requested web server.

Address attestation program 112 determines if the certificate is trusted for the IP address (decision block 510). In an embodiment, if address attestation program 112 receives an indication from the client that the certificate is valid for the desired IP address ("yes" branch, decision block 510), then address attestation program 112 proceeds to step 512. If address attestation program 112 does not receive an indication from the client that the certificate is valid for the desired IP address ("no" branch, decision block 510), then address attestation program 112 proceeds to step 530 to signal a TLS error.

Address attestation program 112 receive the TLS client hello (SNI=URL) (step 512). In an embodiment, if address attestation program 112 receives an indication from the client that the certificate is valid for the desired IP address, then address attestation program 112 receives a client hello message via the tlsd where the SNI is the URL of the desired web server, rather than the IP address of the web server as in step 502.

Address attestation program 112 sends the TLS client hello to the httpd (CN=URL) (step 514). In an embodiment, address attestation program 112 sends the TLS client hello message that was received by the tlsd to the httpd that is the requested web server. The SNI of the message is the URL requested by the client, rather than the IP address as in step 502.

Address attestation program 112 receives the TLS server hello from the httpd (SNI=URL) (step 516). In an embodiment, address attestation program 112 receives a server hello message via the tlsd from the http daemon that is the requested web server. In the message, the SNI is the URL of the requested web server, rather than the IP address as in step 504.

Address attestation program 112 sends the TLS server hello to the client (CN=URL) (step 518). In an embodiment, address attestation program 112 transmits the server hello message that it received from the http daemon to the client via the tlsd. In the message, the CN is the URL of the requested web server, and the message includes an X.509 certificate where the CN in the certificate is the URL of the requested web server.

Address attestation program 112 determines if the certificate is trusted for the URL (decision block 520). In an embodiment, if address attestation program 112 receives an indication from the client that the certificate is valid for the desired URL ("yes" branch, decision block 520), then address attestation program 112 proceeds to step 524. If address attestation program 112 does not receive an indication from the client that the certificate is valid for the desired URL ("no" branch, decision block 520), then address attestation program 112 proceeds to step 530 to signal a TLS error.

Address attestation program 112 processes the http transactions (step 522). In an embodiment, if address attestation program 112 receives an indication from the client that the certificate is valid for the desired URL, then address attestation program 112 begins http transactions between the client and the web server (httpd).

Address attestation program 112 determines if the transactions are complete (decision block 524). In an embodiment, address attestation program 112 determines if the http transactions have completed. If address attestation program 112 determines that the transactions are complete ("yes" branch, decision block 524), then address attestation program 112 proceeds to step 526. If address attestation program 112 determines that the transactions are not complete ("no" branch, decision block 524), then address attestation program 112 returns to step 522.

Address attestation program 112 receives the TCP FIN signal from the client (step 526). In an embodiment, address attestation program 112 receives the TCP FIN command from the client.

Address attestation program 112 sends the TCP FIN/ACK to the client (step 528). In an embodiment, address attestation program 112 sends the TCP FIN/ACK command to the client to terminate the TCP session.

Address attestation program 112 signals a TLS error (step 530). At step 530, if address attestation program 112 receives an indication from the client that the certificate is not valid for the desired URL, then address attestation program 112 will refuse to initiate http transactions with the web server. Address attestation program 112 then signals an error to the client and terminates the TCP session.

Figure 6:
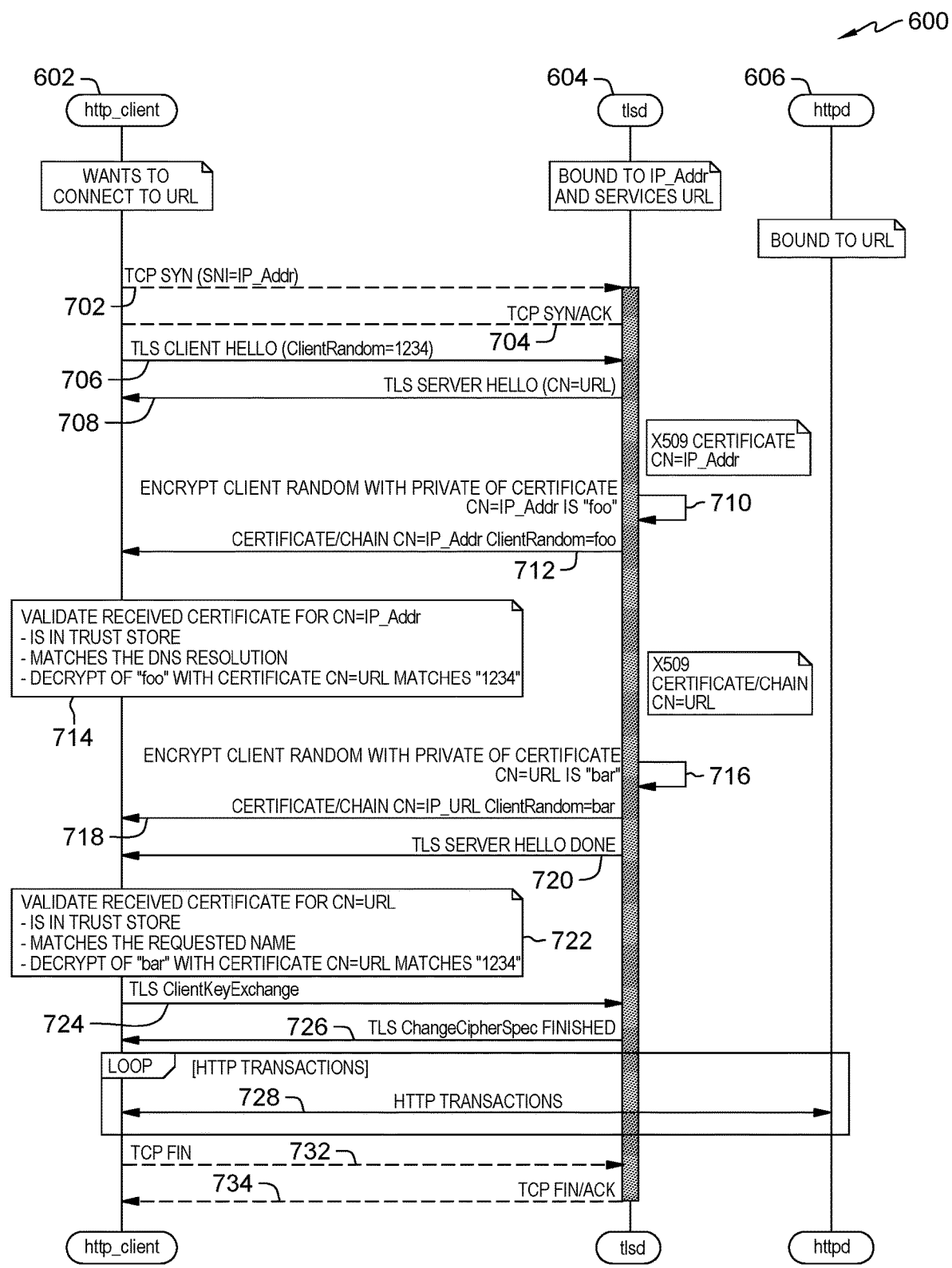
FIG. 6 is a web sequence diagram of the steps to securely communicate with a server providing address attestation using the Diffie-Hellman Key Exchange method, in accordance with an embodiment of the present invention.

FIG. 6 is a web sequence diagram, generally designated 600, representing one embodiment of the present invention. This embodiment demonstrates the Diffie-Hellman Key Exchange method for attesting control over network devices. In the Diffie-Hellman approach to Key Exchange, the client sends a random value, which the server is supposed to encrypt with its own private key and return the encrypted random value along with the certificate. In embodiments of the present invention, however, there are now two certificates. Therefore, the server is required to encrypt the same random value with the corresponding private key for both certificates and return the resulting strings along with the certificates (or certificate chains, if multiple certificates are used in the particular connection). In this way the client can validate that the server (e.g. tlsd 604) is in possession of the private key corresponding to the service name as well as the private key that corresponds to the station address.

Figure 7:
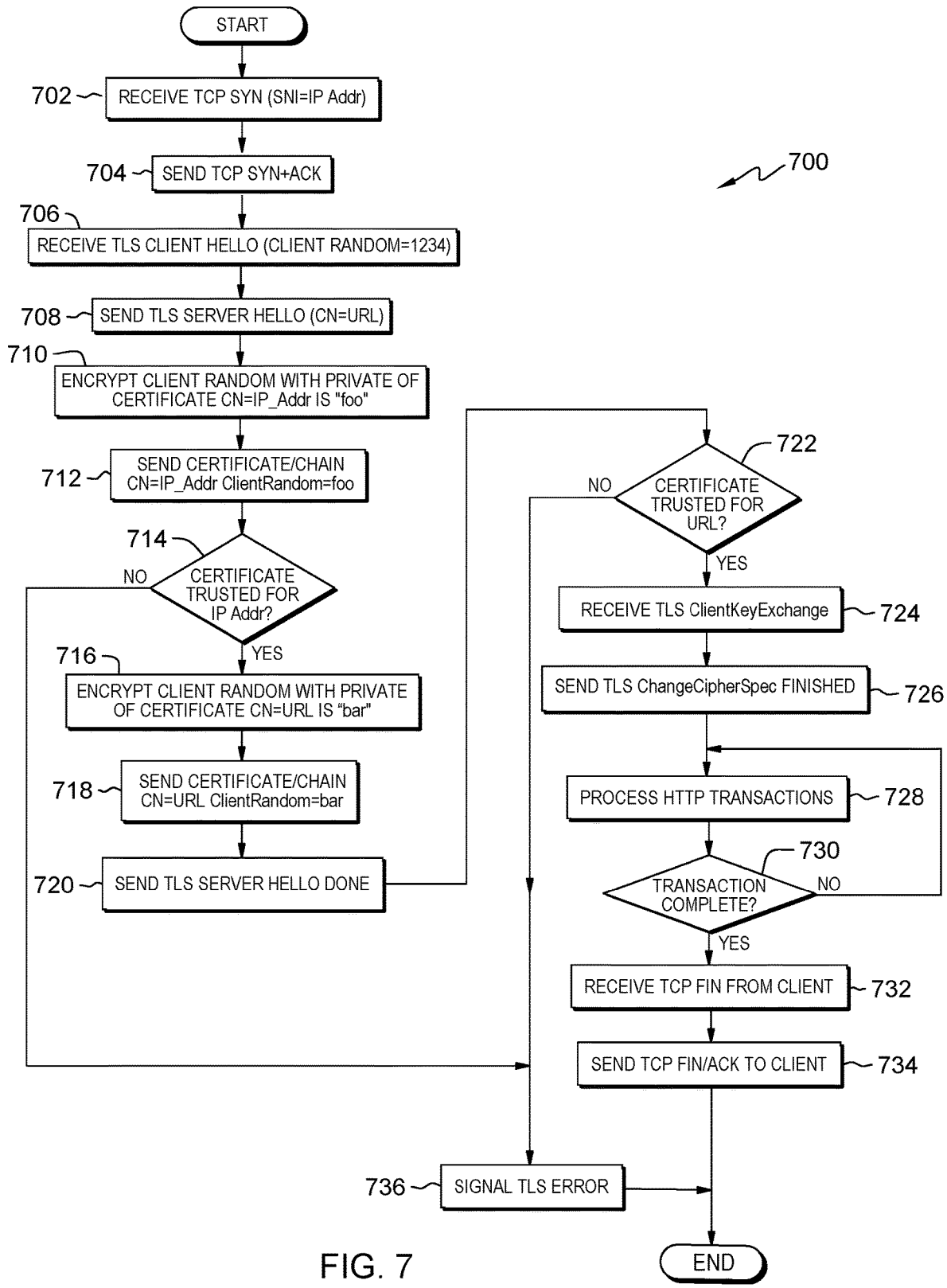
FIG. 7 is a flowchart depicting operational steps of the address attestation program, on a computing device within the distributed data processing environment of FIG. 1, for attesting control over network devices using the Diffie-Hellman Key Exchange method, in accordance with an embodiment of the present invention.

FIG. 7 is a flow chart diagram of workflow 700 depicting operational steps for address attestation program 112 for attesting control over network devices in accordance with at least an embodiment of the invention as depicted in FIG. 6. In an alternative embodiment, the steps of workflow 700 may be performed by any other program while working with address attestation program 112. In an embodiment, address attestation program 112 receives the TCP SYN packet for the IP address. In an embodiment, address attestation program 112 sends the TCP SYN ACK. In an embodiment, address attestation program receives the TLS client hello message which includes the random value chosen by http_client 602. In an embodiment, address attestation program 112 transmits a standard TLS server hello message via the tlsd to http_client 602. In an embodiment, address attestation program 112 encrypts the client random value with the private key of tlsd 604 for the certificate where the CN is the IP address of the desired web service. In an embodiment, address attestation program 112 sends the certificate, or certificate chain, if multiple certificates are used for the particular connection, where the CN is the IP address of the desired web service. In an embodiment, address attestation program 112 determines if the certificate is trusted for the IP address. In an embodiment, if address attestation program 112 determines that the certificate is trusted for the IP address, then address attestation program 112 encrypts the client random value with the private key of tlsd 604 for the certificate where the CN is the URL of the desired web service. In an embodiment, address attestation program 112 sends the certificate, where the CN is the URL of the desired web service, to http_client 602. In an embodiment, address attestation program 112 sends the TLS server hello done via tlsd 604 to http_client 602 to signal that the TLS handshake is complete. In an embodiment, address attestation program 112 determines if the certificate is trusted for the URL. In an embodiment, if address attestation program 112 determines that the certificate is trusted for the URL, then address attestation program 112 receives the TLS client key exchange message from http_client 602. In an embodiment, address attestation program 112 sends the TLS ChangeCipherSpec finished message to http_client 602. In an embodiment, address attestation program 112 begins http transactions between http_client 602 and the web server (httpd 606). In an embodiment, address attestation program 112 determines if the transactions are complete. In an embodiment, if address attestation program 112 determines that the transactions are complete, then address attestation program 112 receives the TCP FIN signal from the client. In an embodiment, address attestation program 112 sends the TCP FIN/ACK to the client. In an embodiment, if address attestation program 112 determines that the certificate is not trusted for the URL, then address attestation program 112 signals a TLS error and terminates the session.

It should be appreciated that embodiments of the present invention provide at least for attesting control over network devices. However, FIG. 7 provides only an illustration of one implementation and does not imply any limitations with regard to the environments in which different embodiments may be implemented. Many modifications to the depicted environment may be made by those skilled in the art without departing from the scope of the invention as recited by the claims.

Address attestation program 112 receives the TCP SYN packet (SNI=IP Addr) (step 702). In an embodiment, address attestation program 112 receives a TCP SYN packet via the TLS daemon, for example, tlsd 604 from FIG. 6, to start the TCP session. TCP SYN is a packet sent to another device requesting that a connection be established. In the message, the SNI is the IP address of the desired web server, for example, httpd 606 from FIG. 6. The IP address of the desired web server was previously obtained by the client via a standard DNS lookup. In this embodiment, one tlsd, e.g., tlsd 604, handles the TCP session initialization and the TLS handshake.

Address attestation program 112 sends the TCP SYN+ACK (step 704). In an embodiment, address attestation program 112 sends the standard TCP acknowledgement to http_client 602.

Address attestation program 112 receives the TLS client hello (ClientRandom=1234) (step 706). In an embodiment, address attestation program 112 receives the TLS client hello message which includes the random value chosen by http_client 602 (e.g., 1234 used in FIG. 6) to encrypt the connection.

Address attestation program 112 sends the TLS server hello to the client (CN=URL) (step 708). In an embodiment, address attestation program 112 transmits a standard TLS server hello message via the tlsd to http_client 602. In the message the CN is the URL of the requested web server.

Address attestation program 112 encrypts the client random value with the private key of certificate CN=IP_Addr is "foo" (step 710). In an embodiment, address attestation program 112 encrypts the client random value with the private key of tlsd 604, for example, "foo" is used in FIG. 6, for the certificate where the CN is the IP address of the desired web service.

Address attestation program 112 sends the certificate/chain with CN=IP_Addr and ClientRandom=foo (step 712). In an embodiment, address attestation program 112 sends the certificate, or certificate chain, if multiple certificates are used for the particular connection, to http_client 602, where the CN is the IP address of the desired web service, and the client random value is, for example, "foo".

Address attestation program 112 determines if the certificate is trusted for the IP address (decision block 714). In an embodiment, if address attestation program 112 receives an indication from http_client 602 that the certificate is valid for the desired IP address ("yes" branch, decision block 714), then address attestation program 112 proceeds to step 712. For http_client 602 to indicate that the certificate is valid for the desired IP address, http_client 602 must determine that the certificate is found in the local trust store of http_client 602; that the certificate matches the DNS resolution from the DNS server; and that the decryption of "foo" with the certificate where the CN is the IP address of the desired web service matches the client random value, e.g., "1234" in the example of FIG. 6.

If address attestation program 112 does not receive an indication from the client that the certificate is valid for the desired IP address ("no" branch, decision block 714), then address attestation program 112 proceeds to step 736 to signal a TLS error.

Address attestation program 112 encrypts the client random value with the private key of certificate CN=URL is "bar" (step 716). In an embodiment, address attestation program 112 encrypts the client random value with the private key of tlsd 604 (e.g., "bar" is used in FIG. 6) for the certificate where the CN is the URL of the desired web service.

Address attestation program 112 sends the certificate/chain where the CN=URL and the ClientRandom=bar (step 718). In an embodiment, address attestation program 112 sends the certificate, or certificate chain, if multiple certificates are used for the particular connection, to http_client 602, where the CN is the URL of the desired web service, and the client random value is, for example, "bar".

Address attestation program 112 sends the TLS server hello done (step 720). In an embodiment, address attestation program 112 sends the TLS server hello done via tlsd 604 to http_client 602 to signal that the TLS handshake is complete.

Address attestation program 112 determines if the certificate is trusted for the URL (decision block 722). In an embodiment, if address attestation program 112 receives an indication from http_client 602 that the certificate is valid for the desired URL ("yes" branch, decision block 722), then address attestation program 112 proceeds to step 712. For http_client 602 to indicate that the certificate is valid for the desired IP address, http_client 602 must determine that the certificate is found in the local trust store of http_client 602; that the certificate matches the requested name; and that the decryption of "bar" with the certificate where the CN is the URL of the desired web service matches the client random value, e.g., "1234" in the example of FIG. 6.

If address attestation program 112 does not receive an indication from the client that the certificate is valid for the desired IP address ("no" branch, decision block 722), then address attestation program 112 proceeds to step 736 to signal a TLS error.

Address attestation program 112 receives the TLS ClientKeyExchange (step 724). In an embodiment, address attestation program 112 receives the TLS client key exchange message from http_client 602. The TLS client key exchange message consists of the handshake header followed by the Diffie-Hellman public value. This allows both the client and server to calculate the same Premaster Secret as required in the Diffie-Hellman method.

Address attestation program 112 sends the TLS ChangeCipherSpec finished (step 726). In an embodiment, address attestation program 112 sends the TLS ChangeCipherSpec finished message to http_client 602. This message signals to http_client 602 that the process of changing the encryption being used between client http_client 602 and server httpd 606 has completed, and the connection is now secure.

Address attestation program 112 processes the http transactions (step 728). In an embodiment, address attestation program 112 begins http transactions between http_client 602 and the web server (httpd 606).

Address attestation program 112 determines if the transactions are complete (decision block 730). In an embodiment, address attestation program 112 determines if the http transactions have completed. If address attestation program 112 determines that the transactions are complete ("yes" branch, decision block 730), then address attestation program 112 proceeds to step 732. If address attestation program 112 determines that the transactions are not complete ("no" branch, decision block 730), then address attestation program 112 returns to step 728.

Address attestation program 112 receives the TCP FIN signal from the client (step 732). In an embodiment, address attestation program 112 receives the TCP FIN command from http_client 602.

Address attestation program 112 sends the TCP FIN/ACK to the client (step 734). In an embodiment, address attestation program 112 sends the TCP FIN/ACK command to http_client 602 to terminate the TCP session.

Address attestation program 112 signals a TLS error (step 736). In an embodiment, if address attestation program 112 receives an indication from http_client 602 that the certificate is not valid for the desired URL, then address attestation program 112 will refuse to initiate http transactions with the web server. Address attestation program 112 then signals an error to http_client 602 and terminates the TCP session.

Figure 8:
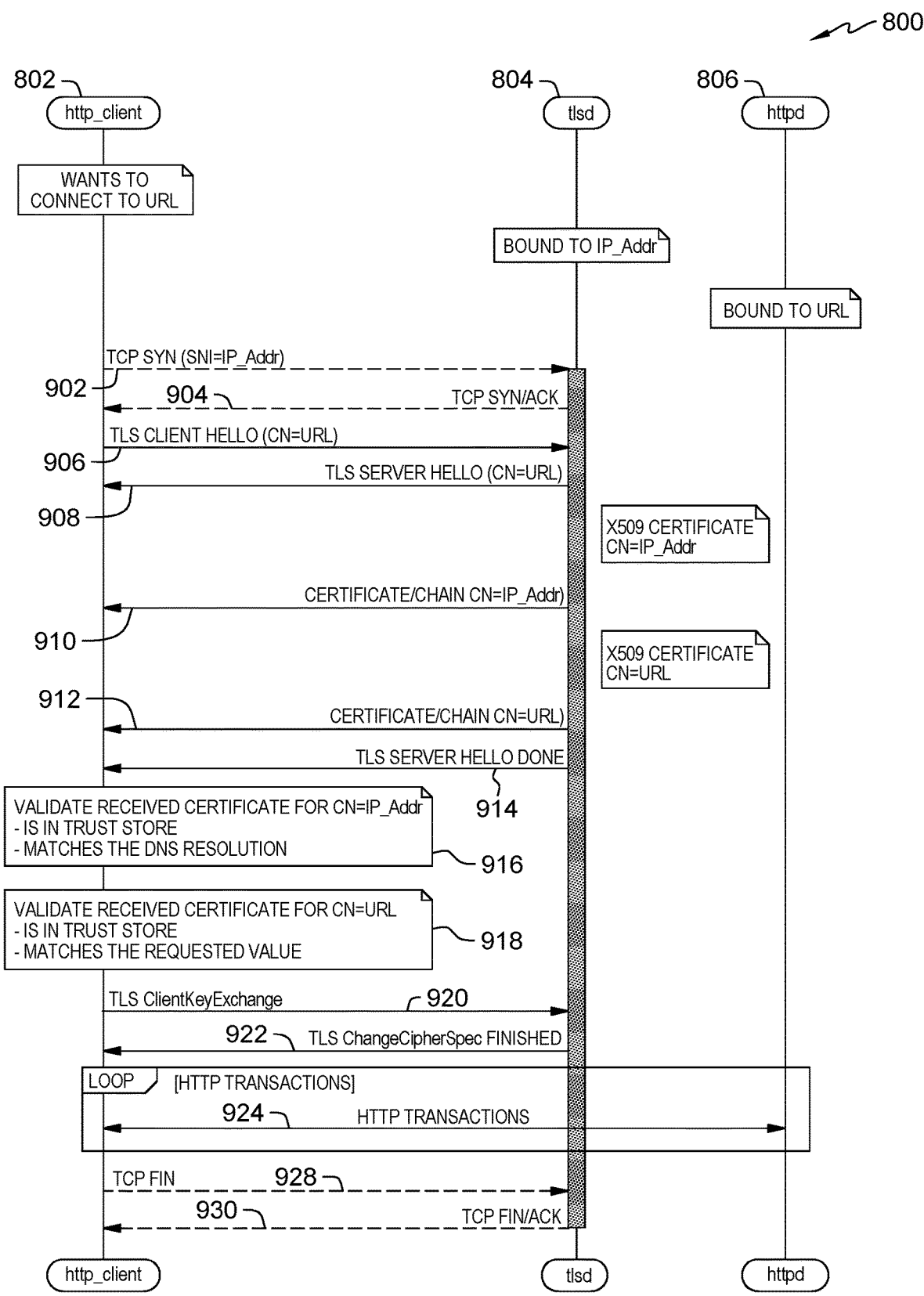
FIG. 8 is a web sequence diagram of the steps to securely communicate with a server providing address attestation using the RSA method, in accordance with an embodiment of the present invention.

FIG. 8 is a web sequence diagram, generally designated 800, representing one embodiment of the present invention. This embodiment demonstrates the RSA Key Exchange method for attesting control over network devices. As in the Diffie-Hellman approach to Key Exchange as explained above, a "server certificate" is sent for authentication. In reality this "server certificate" is actually a collection of standalone (leaf, optional intermediary, and root) certificates, which are mathematically linked. This mathematical linkage allows the client to reconstruct the chain of trust back to the root Certificate Authority regardless of the received order.

In the RSA approach the server simply adds additional certificate(s) to the TLS2 message for the client to reconstruct the chain of trust for each leaf certificate that is received.

Figure 9:
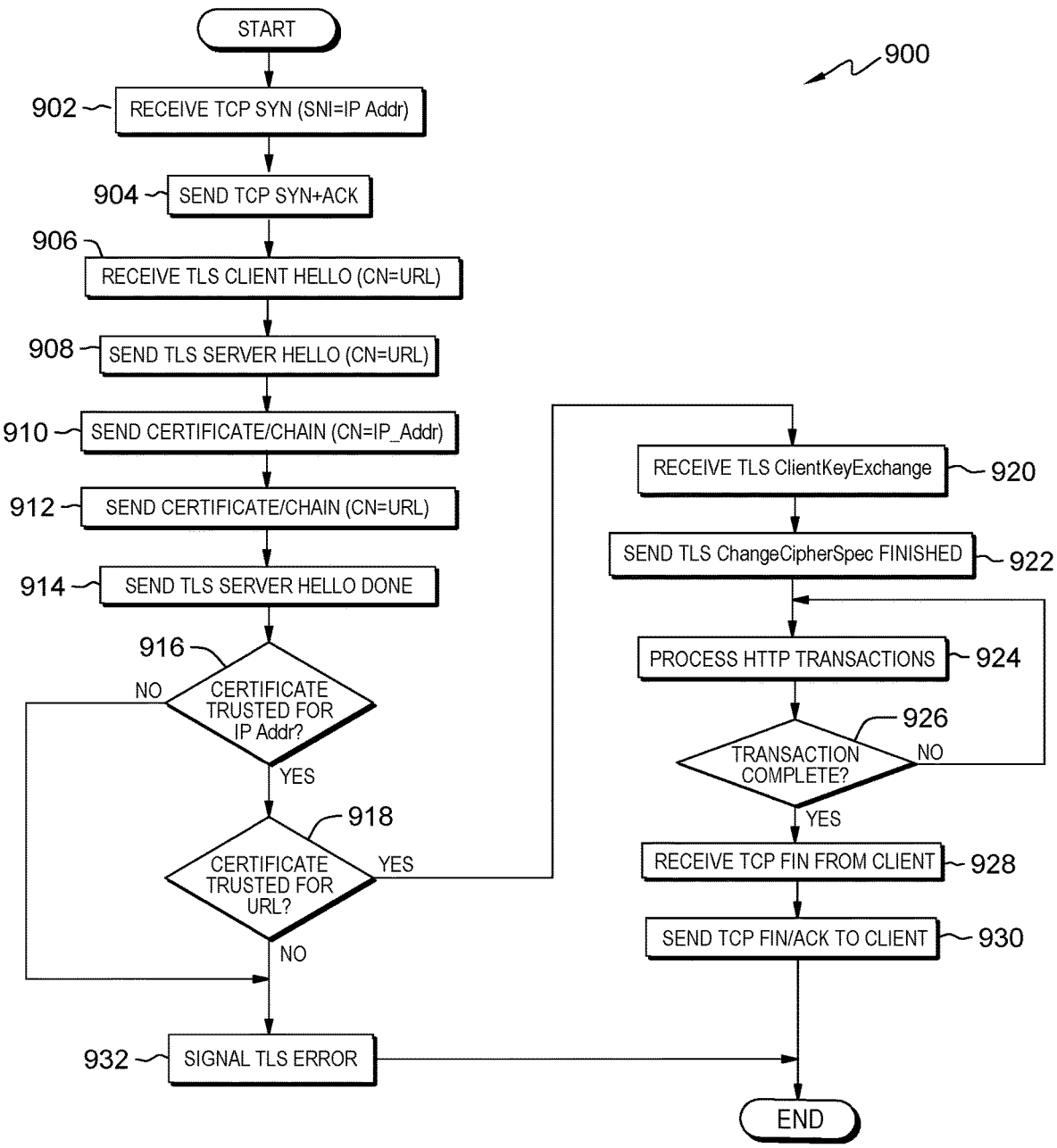
FIG. 9 is a flowchart depicting operational steps of the address attestation program, on a computing device within the distributed data processing environment of FIG. 1, for attesting control over network devices using the RSA method, in accordance with an embodiment of the present invention.

FIG. 9 is a flow chart diagram of workflow 900 depicting operational steps for address attestation program 112 for attesting control over network devices in accordance with at least an embodiment of the invention as depicted in FIG. 8. In an alternative embodiment, the steps of workflow 900 may be performed by any other program while working with address attestation program 112. In an embodiment, address attestation program 112 receives the TCP SYN packet for the IP address. In an embodiment, address attestation program 112 sends the TCP SYN ACK. In an embodiment, address attestation program receives the TLS client hello message where the CN is the URL of the desired web service. In an embodiment, address attestation program 112 transmits a standard TLS server hello message via the tlsd to http_client 802. In an embodiment, address attestation program 112 sends the certificate, or certificate chain, if multiple certificates are used for the particular connection, to http_client 802, where the CN is the IP address of the desired web service. In an embodiment, address attestation program 112 sends the TLS server hello done via tlsd 804 to http_client 802 to signal that the TLS handshake is complete. In an embodiment, address attestation program 112 determines if the certificate is trusted for the IP address. In an embodiment, if address attestation program 112 determines that the certificate is trusted for the IP address, then address attestation program 112 receives the TLS client key exchange message from http_client 802. In an embodiment, address attestation program 112 sends the TLS ChangeCipherSpec finished message to http_client 802. In an embodiment, address attestation program 112 begins http transactions between http_client 802 and the web server (httpd 806). In an embodiment, address attestation program 112 determines if the transactions are complete. In an embodiment, if address attestation program 112 determines that the transactions are complete, then address attestation program 112 receives the TCP FIN signal from the client. In an embodiment, address attestation program 112 sends the TCP FIN/ACK to the client. In an embodiment, if address attestation program 112 determines that the certificate is not trusted for the URL, then address attestation program 112 signals a TLS error and terminates the session.

It should be appreciated that embodiments of the present invention provide at least for attesting control over network devices. However, FIG. 9 provides only an illustration of one implementation and does not imply any limitations with regard to the environments in which different embodiments may be implemented. Many modifications to the depicted environment may be made by those skilled in the art without departing from the scope of the invention as recited by the claims.

Address attestation program 112 receives the TCP SYN packet (SNI=IP Addr) (step 902). In an embodiment, address attestation program 112 receives a TCP SYN packet via the TLS daemon, for example, tlsd 804 from FIG. 8, to start the TCP session. TCP SYN is a packet sent to another device requesting that a connection be established. In the message, the SNI is the IP address of the desired web server, for example, httpd 806 from FIG. 8. The IP address of the desired web server was previously obtained by the client via a standard DNS lookup. In this embodiment, one tlsd, e.g., tlsd 804, handles the TCP session initialization and the TLS handshake.

Address attestation program 112 sends the TCP SYN+ACK (step 904). In an embodiment, address attestation program 112 sends the standard TCP acknowledgement to http_client 802.

Address attestation program 112 receives the TLS client hello (CN=URL) (step 906). In an embodiment, address attestation program 112 receives the TLS client hello message where the CN is the URL of the desired web service.

Address attestation program 112 sends the TLS server hello to the client (CN=URL) (step 908). In an embodiment, address attestation program 112 transmits a standard TLS server hello message via the tlsd to http_client 802. In the message the CN is the URL of the requested web server.

Address attestation program 112 sends the certificate/chain with CN=IP_Addr (step 912). In an embodiment, address attestation program 112 sends the certificate, or certificate chain, if multiple certificates are used for the particular connection, to http_client 802, where the CN is the IP address of the desired web service.

Address attestation program 112 sends the TLS server hello done (step 914). In an embodiment, address attestation program 112 sends the TLS server hello done via tlsd 804 to http_client 802 to signal that the TLS handshake is complete.

Address attestation program 112 determines if the certificate is trusted for the IP address (decision block 916). In an embodiment, if address attestation program 112 receives an indication from http_client 802 that the certificate is valid for the desired IP address ("yes" branch, decision block 916), then address attestation program 112 proceeds to step 918. For http_client 802 to indicate that the certificate is valid for the desired IP address, http_client 802 must determine that the certificate is found in the local trust store of http_client 802, and that the certificate matches the DNS resolution from the DNS server.

If address attestation program 112 does not receive an indication from the client that the certificate is valid for the desired IP address ("no" branch, decision block 916), then address attestation program 112 proceeds to step 932 to signal a TLS error.

Address attestation program 112 determines if the certificate is trusted for the URL (decision block 918). In an embodiment, if address attestation program 112 receives an indication from http_client 802 that the certificate is valid for the desired URL ("yes" branch, decision block 918), then address attestation program 112 proceeds to step 920. For http_client 802 to indicate that the certificate is valid for the desired URL, http_client 802 must determine that the certificate is found in the local trust store of http_client 802, and that the certificate matches the requested value.

If address attestation program 112 does not receive an indication from the client that the certificate is valid for the desired URL ("no" branch, decision block 918), then address attestation program 112 proceeds to step 932 to signal a TLS error.

Address attestation program 112 receives the TLS ClientKeyExchange (step 920). In an embodiment, address attestation program 112 receives the TLS client key exchange message from http_client 802. In the RSA method, http_client 802 will have generated a 48-byte premaster Secret, encrypts it using the public Key from the certificate sent in the serverCertificate message or the temporary RSA key provided in a ServerKeyExchange message, and address attestation program 112 receives the result in an encrypted premaster secret message.

Address attestation program 112 sends the TLS ChangeCipherSpec finished (step 922). In an embodiment, address attestation program 112 sends the TLS ChangeCipherSpec finished message to http_client 802. This message signals to http_client 802 that the process of changing the encryption being used between client http_client 802 and server httpd 806 has completed, and the connection is now secure.

Address attestation program 112 processes the http transactions (step 924). In an embodiment, address attestation program 112 begins http transactions between http_client 802 and the web server (httpd 806).

Address attestation program 112 determines if the transactions are complete (decision block 926). In an embodiment, address attestation program 112 determines if the http transactions have completed. If address attestation program 112 determines that the transactions are complete ("yes" branch, decision block 926), then address attestation program 112 proceeds to step 932. If address attestation program 112 determines that the transactions are not complete ("no" branch, decision block 926), then address attestation program 112 returns to step 924.

Address attestation program 112 receives the TCP FIN signal from the client (step 928). In an embodiment, address attestation program 112 receives the TCP FIN command from http_client 802.

Address attestation program 112 sends the TCP FIN/ACK to the client (step 930). In an embodiment, address attestation program 112 sends the TCP FIN/ACK command to http_client 802 to terminate the TCP session.

Address attestation program 112 signals a TLS error (step 932). In an embodiment, if address attestation program 112 receives an indication from http_client 802 that the certificate is not valid for the desired URL, then address attestation program 112 will refuse to initiate http transactions with the web server. Address attestation program 112 then signals an error to http_client 802 and terminates the TCP session.

Figure 10:
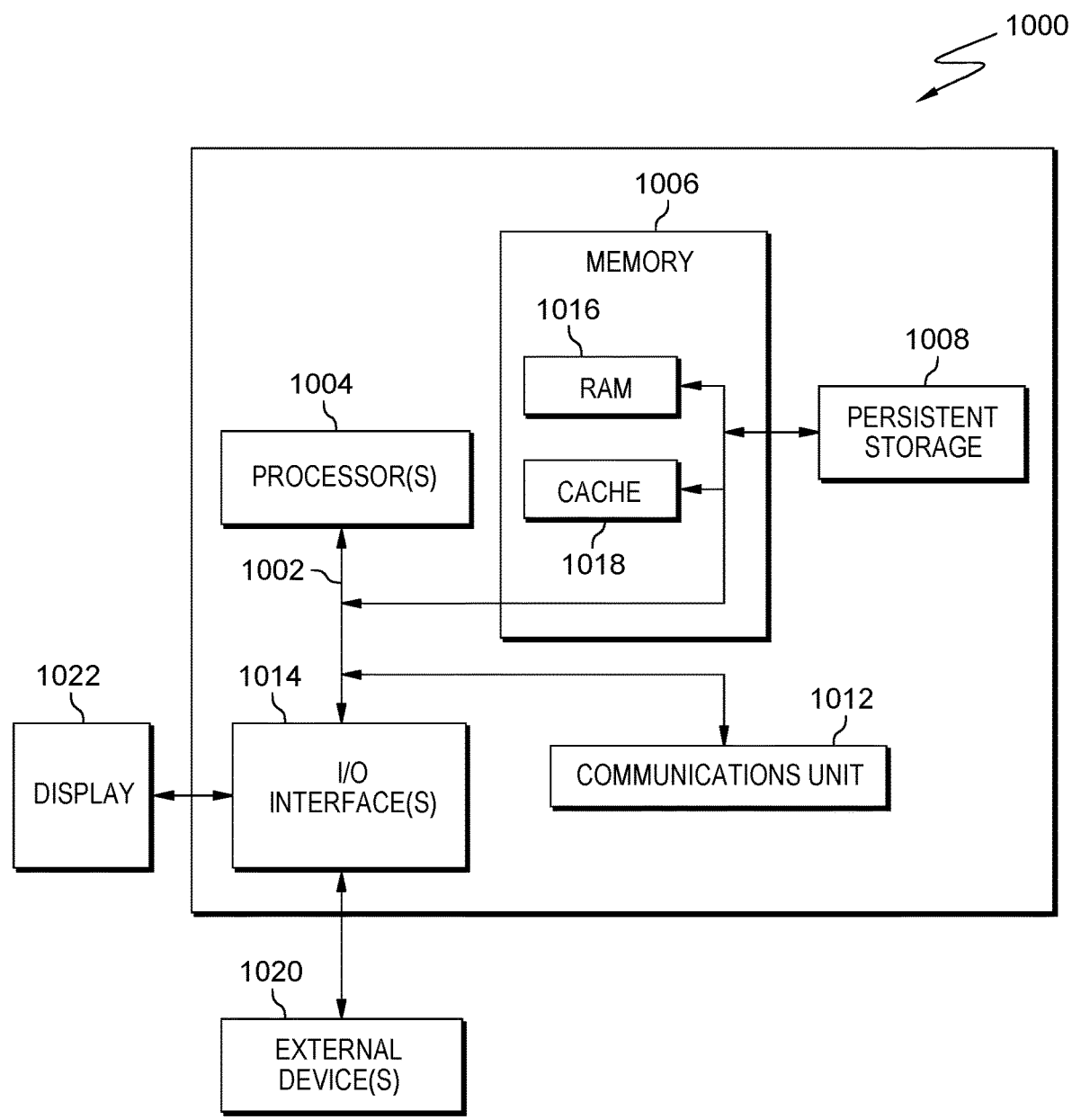
FIG. 10 depicts a block diagram of components of the computing devices executing the address attestation program within the distributed data processing environment of FIG. 1, in accordance with an embodiment of the present invention.

FIG. 10 is a block diagram depicting components of computing device 110 suitable for address attestation program 112, in accordance with at least one embodiment of the invention. FIG. 10 displays the computer 1000, one or more processor(s) 1004 (including one or more computer processors), a communications fabric 1002, a memory 1006 including, a random-access memory (RAM) 1016, and a cache 1018, a persistent storage 1008, a communications unit 1012, I/O interfaces 1014, a display 1022, and external devices 1020. It should be appreciated that FIG. 10 provides only an illustration of one embodiment and does not imply any limitations with regard to the environments in which different embodiments may be implemented. Many modifications to the depicted environment may be made.

As depicted, the computer 1000 operates over the communications fabric 1002, which provides communications between the computer processor(s) 1004, memory 1006, persistent storage 1008, communications unit 1012, and input/output (I/O) interface(s) 1014. The communications fabric 1002 may be implemented with an architecture suitable for passing data or control information between the processors 1004 (e.g., microprocessors, communications processors, and network processors), the memory 1006, the external devices 1020, and any other hardware components within a system. For example, the communications fabric 1002 may be implemented with one or more buses.

The memory 1006 and persistent storage 1008 are computer readable storage media. In the depicted embodiment, the memory 1006 comprises a RAM 1016 and a cache 1018. In general, the memory 1006 can include any suitable volatile or non-volatile computer readable storage media. Cache 1018 is a fast memory that enhances the performance of processor(s) 1004 by holding recently accessed data, and near recently accessed data, from RAM 1016.

Program instructions for address attestation program 112 may be stored in the persistent storage 1008, or more generally, any computer readable storage media, for execution by one or more of the respective computer processors 1004 via one or more memories of the memory 1006. The persistent storage 1008 may be a magnetic hard disk drive, a solid-state disk drive, a semiconductor storage device, read only memory (ROM), electronically erasable programmable read-only memory (EEPROM), flash memory, or any other computer readable storage media that is capable of storing program instruction or digital information.

The media used by persistent storage 1008 may also be removable. For example, a removable hard drive may be used for persistent storage 1008. Other examples include optical and magnetic disks, thumb drives, and smart cards that are inserted into a drive for transfer onto another computer readable storage medium that is also part of persistent storage 1008.

The communications unit 1012, in these examples, provides for communications with other data processing systems or devices. In these examples, the communications unit 1012 includes one or more network interface cards. The communications unit 1012 may provide communications through the use of either or both physical and wireless communications links. In the context of some embodiments of the present invention, the source of the various input data may be physically remote to the computer 1000 such that the input data may be received, and the output similarly transmitted via the communications unit 1012.

The I/O interface(s) 1014 allows for input and output of data with other devices that may be connected to computer 1000. For example, the I/O interface(s) 1014 may provide a connection to external device(s) 1020 such as a keyboard, a keypad, a touch screen, a microphone, a digital camera, and/or some other suitable input device. External device(s) 1020 can also include portable computer readable storage media such as, for example, thumb drives, portable optical or magnetic disks, and memory cards. Software and data used to practice embodiments of the present invention, e.g., address attestation program 112, can be stored on such portable computer readable storage media and can be loaded onto persistent storage 1008 via the I/O interface(s) 1014. I/O interface(s) 1014 also connect to a display 1022.

Display 1022 provides a mechanism to display data to a user and may be, for example, a computer monitor. Display 1022 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for secure communications, the computer-implemented method comprising:
responsive to receiving a first signal from a client, wherein the first signal initiates a network connection between the client and a server, sending, by one or more computer processors, a first certificate to the client, wherein the first certificate contains a first common name that is an internet protocol (IP) address;
sending, by the one or more computer processors, a second certificate to the client, wherein the second certificate contains a second common name that is a uniform resource locator (URL) of the server; and
responsive to receiving a second signal from the client that the first certificate and the second certificate are trusted, connecting, by the one or more computer processors, the client with the server.

2. The computer-implemented method of claim 1, wherein responsive to receiving the first signal from the client, wherein the first signal initiates the network connection between the client and the server, sending the first certificate to the client, wherein the first certificate contains the first common name that is the IP address, comprises:
receiving, by the one or more computer processors, a transmission control protocol (TCP) synchronize packet (TCP SYN) and a first transport layer security (TLS) client hello message from the client on a TLS daemon, wherein the first TLS client hello message contains a first server name identification that is the IP address; and
responsive to receiving the TCP SYN and the first TLS client hello message on the TLS daemon, sending, by the one or more computer processors, a first TLS server hello message and a first certificate to the client, wherein the first certificate contains a first common name that is the IP address.

3. The computer-implemented method of claim 2, wherein sending the second certificate to the client, wherein the second certificate contains the second common name that is the URL of the server, comprises:
receiving, by the one or more computer processors, a second TLS client hello message from the client on the TLS daemon, wherein the second TLS client hello message contains a second server name identification that is the URL;
sending, by the one or more computer processors, the second TLS client hello message from the TLS daemon to a Hypertext Transfer Protocol daemon (HTTPd) at the URL;
receiving, by the one or more computer processors, a second TLS server hello message and the second certificate from the HTTPd on the TLS daemon, wherein the second TLS server hello message contains a second common name that is the URL; and
responsive to receiving the second TLS server hello message from the HTTPd on the TLS daemon, sending, by the one or more computer processors, the second TLS server hello message and the second certificate to the client.

4. The computer-implemented method of claim 1, wherein responsive to receiving the first signal from the client, wherein the first signal initiates the network connection between the client and the server, sending the first certificate to the client, wherein the first certificate contains the first common name that is the IP address, comprises:
receiving, by the one or more computer processors, a TCP SYN message from the client on a first TLS daemon, wherein the TCP SYN message contains a first server name identification that is an IP address;
sending, by the one or more computer processors, a TCP acknowledge (TCP ACK) message from the first TLS daemon to the client, wherein the TCP ACK message contains a port number for a second TLS daemon;
receiving, by the one or more computer processors, a first TLS client hello message on the second TLS daemon, wherein the first TLS client hello message contains a first server name identification that is the IP address; and
responsive to receiving the first TLS client hello message on the second TLS daemon, sending, by the one or more computer processors, a first certificate to the client, wherein the first certificate contains a first common name that is the IP address.

5. The computer-implemented method of claim 1, wherein responsive to receiving the first signal from the client, wherein the first signal initiates the network connection between the client and the server, sending the first certificate to the client, wherein the first certificate contains the first common name that is the IP address, sending a first certificate to the client, comprises:
receiving, by the one or more computer processors, a TCP SYN message from the client on a TLS daemon, wherein the TCP SYN message contains a first server name identification that is an IP address;
sending, by the one or more computer processors, a TCP acknowledge (TCP ACK) message from the TLS daemon to the client;
receiving, by the one or more computer processors, a TLS client hello message on the TLS daemon, wherein the TLS client hello message contains a client random value;
sending, by the one or more computer processors, a TLS server hello message, wherein the TLS server hello message contains a first common name that is the URL;
encrypting, by the one or more computer processors, the client random value with a first private key, wherein the first private key is based on the IP address; and
sending, by the one or more computer processors, a first encrypted client random and a first certificate to the client, wherein the first certificate contains a second common name that is the IP address.

6. The computer-implemented method of claim 5, wherein sending the second certificate to the client, wherein the second certificate contains the second common name that is the URL of the server, comprises:
encrypting, by the one or more computer processors, the client random value with a second private key, wherein the second private key is based on the URL;
sending, by the one or more computer processors, a second encrypted client random and a second certificate to the client, wherein the second certificate contains the first common name that is the URL; and
sending, by the one or more computer processors, a TLS server hello done message to the client.

7. The computer-implemented method of claim 1, wherein responsive to receiving the first signal from the client, wherein the first signal initiates the network connection between the client and the server, sending the first certificate to the client, wherein the first certificate contains the first common name that is the IP address, sending a first certificate to the client, comprises:
  receiving, by the one or more computer processors, a TCP SYN message from the client on a TLS daemon, wherein the TCP SYN message contains a first server name identification that is an IP address;
  sending, by the one or more computer processors, a TCP acknowledge (TCP ACK) message from the TLS daemon to the client;
  receiving, by the one or more computer processors, a TLS client hello message on the TLS daemon, wherein the TLS client hello message contains a first common name that is the URL;
  sending, by the one or more computer processors, a TLS server hello message, wherein the TLS server hello message contains the first common name that is the URL; and
  sending, by the one or more computer processors, a first certificate to the client, wherein the first certificate contains a second common name that is the IP address.

8. The computer-implemented method of claim 7, wherein sending the second certificate to the client, wherein the second certificate contains the second common name that is the URL of the server, comprises:
  sending, by the one or more computer processors, a second certificate to the client, wherein the second certificate contains the first common name that is the URL; and
  sending, by the one or more computer processors, a TLS server hello done message to the client.

9. A computer program product for secure communication, the computer program product comprising:
  one or more computer readable storage media and program instructions stored on the one or more computer readable storage media, the program instructions including instructions to:
  responsive to receiving a first signal from a client, wherein the first signal initiates a network connection between the client and a server, sending a first certificate to the client, wherein the first certificate contains a first common name that is an internet protocol (IP) address;
  send a second certificate to the client, wherein the second certificate contains a second common name that is a uniform resource locator (URL) of the server; and
  responsive to receiving a second signal from the client that the first certificate and the second certificate are trusted, connecting the client with the server.

10. The computer program product of claim 9, wherein responsive to receiving the first signal from the client, wherein the first signal initiates the network connection between the client and the server, sending the first certificate to the client, wherein the first certificate contains the first common name that is the IP address, comprises one or more of the following program instructions, stored on the one or more computer readable storage media, to:
  receive a transmission control protocol (TCP) synchronize packet (TCP SYN) and a first transport layer security (TLS) client hello message from the client on a TLS daemon, wherein the first TLS client hello message contains a first server name identification that is the IP address; and
  responsive to receiving the TCP SYN and the first TLS client hello message on the TLS daemon, send a first TLS server hello message and a first certificate to the client, wherein the first certificate contains a first common name that is the IP address.

11. The computer program product of claim 10, wherein sending the second certificate to the client, wherein the second certificate contains the second common name that is the URL of the server, comprises one or more of the following program instructions, stored on the one or more computer readable storage media, to:
  receive a second TLS client hello message from the client on the TLS daemon, wherein the second TLS client hello message contains a second server name identification that is the URL;
  send the second TLS client hello message from the TLS daemon to a Hypertext Transfer Protocol daemon (HTTPd) at the URL;
  receive a second TLS server hello message and the second certificate from the HTTPd on the TLS daemon, wherein the second TLS server hello message contains a second common name that is the URL; and
  responsive to receiving the second TLS server hello message from the HTTPd on the TLS daemon, send the second TLS server hello message and the second certificate to the client.

12. The computer program product of claim 9, wherein responsive to receiving the first signal from the client, wherein the first signal initiates the network connection between the client and the server, sending the first certificate to the client, wherein the first certificate contains the first common name that is the IP address, comprises one or more of the following program instructions, stored on the one or more computer readable storage media, to:
  receive a TCP SYN message from the client on a first TLS daemon, wherein the TCP SYN message contains a first server name identification that is an IP address;
  send a TCP acknowledge (TCP ACK) message from the first TLS daemon to the client, wherein the TCP ACK message contains a port number for a second TLS daemon;
  receive a first TLS client hello message on the second TLS daemon, wherein the first TLS client hello message contains a first server name identification that is the IP address; and
  responsive to receiving the first TLS client hello message on the second TLS daemon, send a first certificate to the client, wherein the first certificate contains a first common name that is the IP address.

13. The computer program product of claim 9, wherein responsive to receiving the first signal from the client, wherein the first signal initiates the network connection between the client and the server, sending the first certificate to the client, wherein the first certificate contains the first common name that is the IP address, sending a first certificate to the client, comprises one or more of the following program instructions, stored on the one or more computer readable storage media, to:
  receive a TCP SYN message from the client on a TLS daemon, wherein the TCP SYN message contains a first server name identification that is an IP address;
  send a TCP acknowledge (TCP ACK) message from the TLS daemon to the client;
  receive a TLS client hello message on the TLS daemon, wherein the TLS client hello message contains a client random value;
  send a TLS server hello message, wherein the TLS server hello message contains a first common name that is the URL;
  encrypt the client random value with a first private key, wherein the first private key is based on the IP address; and send a first encrypted client random and a first certificate to the client, wherein the first certificate contains a second common name that is the IP address.

14. The computer program product of claim 13, wherein sending the second certificate to the client, wherein the second certificate contains the second common name that is the URL of the server, comprises one or more of the following program instructions, stored on the one or more computer readable storage media, to:
encrypt the client random value with a second private key, wherein the second private key is based on the URL;
send a second encrypted client random and a second certificate to the client, wherein the second certificate contains the first common name that is the URL; and
send a TLS server hello done message to the client.

15. The computer program product of claim 9, wherein responsive to receiving the first signal from the client, wherein the first signal initiates the network connection between the client and the server, sending the first certificate to the client, wherein the first certificate contains the first common name that is the IP address, sending a first certificate to the client, comprises one or more of the following program instructions, stored on the one or more computer readable storage media, to:
receive a TCP SYN message from the client on a TLS daemon, wherein the TCP SYN message contains a first server name identification that is an IP address;
send a TCP acknowledge (TCP ACK) message from the TLS daemon to the client;
receive a TLS client hello message on the TLS daemon, wherein the TLS client hello message contains a first common name that is the URL;
send a TLS server hello message, wherein the TLS server hello message contains the first common name that is the URL; and
send a first certificate to the client, wherein the first certificate contains a second common name that is the IP address.

16. The computer program product of claim 15, wherein sending the second certificate to the client, wherein the second certificate contains the second common name that is the URL of the server, comprises one or more of the following program instructions, stored on the one or more computer readable storage media, to:
send a second certificate to the client, wherein the second certificate contains the first common name that is the URL; and
send a TLS server hello done message to the client.

17. A computer system for secure communication, the computer system comprising:
one or more computer processors;
one or more computer readable storage media; and
program instructions stored on the one or more computer readable storage media for execution by at least one of the one or more computer processors, the stored program instructions including instructions to:
responsive to receiving a first signal from a client, wherein the first signal initiates a network connection between the client and a server, sending a first certificate to the client, wherein the first certificate contains a first common name that is an internet protocol (IP) address;
send a second certificate to the client, wherein the second certificate contains a second common name that is a uniform resource locator (URL) of the server; and
responsive to receiving a second signal from the client that the first certificate and the second certificate are trusted, connecting the client with the server.

18. The computer system of claim 17, wherein responsive to receiving the first signal from the client, wherein the first signal initiates the network connection between the client and the server, sending the first certificate to the client, wherein the first certificate contains the first common name that is the IP address, comprises one or more of the following program instructions, stored on the one or more computer readable storage media, to:
receive a transmission control protocol (TCP) synchronize packet (TCP SYN) and a first transport layer security (TLS) client hello message from the client on a TLS daemon, wherein the first TLS client hello message contains a first server name identification that is the IP address; and
responsive to receiving the TCP SYN and the first TLS client hello message on the TLS daemon, send a first TLS server hello message and a first certificate to the client, wherein the first certificate contains a first common name that is the IP address.

19. The computer system of claim 18, wherein sending the second certificate to the client, wherein the second certificate contains the second common name that is the URL of the server, comprises one or more of the following program instructions, stored on the one or more computer readable storage media, to:
receive a second TLS client hello message from the client on the TLS daemon, wherein the second TLS client hello message contains a second server name identification that is the URL;
send the second TLS client hello message from the TLS daemon to a Hypertext Transfer Protocol daemon (HTTPd) at the URL;
receive a second TLS server hello message and the second certificate from the HTTPd on the TLS daemon, wherein the second TLS server hello message contains a second common name that is the URL; and
responsive to receiving the second TLS server hello message from the HTTPd on the TLS daemon, send the second TLS server hello message and the second certificate to the client.

20. The computer system of claim 17, wherein responsive to receiving the first signal from the client, wherein the first signal initiates the network connection between the client and the server, sending the first certificate to the client, wherein the first certificate contains the first common name that is the IP address, comprises one or more of the following program instructions, stored on the one or more computer readable storage media, to:
receive a TCP SYN message from the client on a first TLS daemon, wherein the TCP SYN message contains a first server name identification that is an IP address;
send a TCP acknowledge (TCP ACK) message from the first TLS daemon to the client, wherein the TCP ACK message contains a port number for a second TLS daemon;
receive a first TLS client hello message on the second TLS daemon, wherein the first TLS client hello message contains a first server name identification that is the IP address; and
responsive to receiving the first TLS client hello message on the second TLS daemon, send a first certificate to the client, wherein the first certificate contains a first common name that is the IP address.

\* \* \* \* \*